United States Patent [19]

Willem

[11] 4,057,687

[45] Nov. 8, 1977

[54] CONNECTION BETWEEN CORE AND ARMATURES OF STRUCTURES COMPRISING A CORE OF AGGLOMERATED FIBRES

[75] Inventor: Michel Willem, Abrest, France

[73] Assignee: Ceraver, Paris, France

[21] Appl. No.: 631,276

[22] Filed: Nov. 12, 1975

[30] Foreign Application Priority Data

Nov. 25, 1974 France ................................ 74.38589

[51] Int. Cl.[2] ...................... H01B 17/12; H01B 17/14; F16B 7/02

[52] U.S. Cl. ...................................... 174/179; 29/452; 29/631; 174/164; 174/186; 264/229; 403/267; 403/268

[58] Field of Search .................... 174/158 R, 164, 165, 174/166 R, 169, 176, 177, 178, 179, 186, 188, 189, 194, 195, 196, 201, 209; 403/265, 267, 268, 269, 334, 404; 29/452, 631; 52/230; 264/229

[56] References Cited

U.S. PATENT DOCUMENTS

| | | | |
|---|---|---|---|
| 1,813,172 | 7/1931 | Kraner | 174/178 |
| 3,118,968 | 1/1964 | Moussou | 174/179 |
| 3,499,129 | 3/1970 | Hulteen et al. | 174/179 X |
| 3,586,758 | 6/1971 | Harmon et al. | 174/179 X |

FOREIGN PATENT DOCUMENTS

| | | | |
|---|---|---|---|
| 1,234,852 | 5/1960 | France | 174/179 |
| 1,092,976 | 11/1960 | Germany | 174/189 |
| 454,989 | 6/1968 | Switzerland | 174/176 |
| 1,346,084 | 2/1974 | United Kingdom | 174/195 |

*Primary Examiner*—Laramie E. Askin
*Attorney, Agent, or Firm*—Sughrue, Rothwell, Mion, Zinn and Macpeak

[57] ABSTRACT

Structure intended to transmit great mechanical stresses, comprising an elongated core comprising at least an agglomerated glass fibre rod and fixing armatures fitted to the ends of the core, comprising means exerting radial compression stresses or stresses tending to jam the rod and maintaining at least partly those efforts in a zone of the structure situated in the armatures, even when the structure is not subjected to mechanical stresses. The structure has application to insulators for electric apparatus, stays, suspension of electric power conveying lines.

5 Claims, 16 Drawing Figures

CONNECTION BETWEEN CORE AND ARMATURES OF STRUCTURES COMPRISING A CORE OF AGGLOMERATED FIBRES

FIELD OF THE INVENTION

The present invention concerns a structure intended for transmitting great mechanical stresses, comprising an elongated core comprising at least one rod of agglomerated glasse fibres and fixing armatures fitted to the ends of the core, by means of which the mechanical efforts are transmitted. It relates more particularly to an improvement in the connection between core and armature of such structures.

DESCRIPTION OF THE PRIOR ART

Numerous types of structures of that kind are known and are used more particularly as control means for electric equipment, more particularly for circuit-breakers or cut-out switches, as insulators for stays or as insulators for the suspension of electric power conveying lines. More particularly, structures having elongated cores constituted by several rods sealed at their ends have been proposed.

One of the most difficult problems in the manufacturing of such strucutures is that of the connecting of the core and of the armatures, in order to ensure, for a minimum bulk, a maximum transmission of stress between the core and the armatures, while avoiding or reducing any form of stress of the fibres to which these latter are poorly suited, such as shearing or high local loads, unequal mechanical stresses on the various fibres, bends at a short radius, etc . . .

An object of the present invention is to provide a solution to the above problem which will enable the producing of structures bearing traction stresses higher than those obtained with known structures, while keeping to a slight bulk and a moderate cost price.

SUMMARY OF THE INVENTION

The structure according to the invention is characterized in that it comprises means exerting radial compression stresses or stresses tending to jam the rod and enabling these stresses to be maintained at least partly in a zone of the structure situated in the armatures, even when the structure is not subjected to any mechanical stress.

It comprises, moreover, preferably at least one of the following characteristics:

the core is fixed at at least one of its ends in a sealing recess tapering on either side of an intermediate zone of the said recess; the sealing recess comprises several narrower intermediate zones alternating with tapering zones;

the core is sealed in the sealing recess in a state of longitudinal mechanical tension;

the means exerting radial compression stresses or stresses tending to jam the rod are constituted by a sealing substance and the end of the rod arranged on the external side of the armature is machined with an undercut or is preferably threaded, over a slight thickness in relation to its transversal dimension;

the core comprises several rods and it is sealed at at least one of its ends in a sealing recess common to the various rods;

The sealing recess is formed in a fixing part constituting the armature, or in a fixing part connected to the armature;

the core comprises several rods and it is sealed at at least one of its ends in a number of sealing recesses equal to the number of rods;

the armatures are made of a metal moulded directly around the ends of the fixing parts.

It comprises internal or external fixing means beyond at least one sealing recess on the same side as the armature.

The core comprises several rods and it is sealed at at least one of its ends in a recess comprising a number of separate parts equal to the number of rods, the said parts tapering towards one edge of the recess and communicating in an intermediate zone with one and the same part tapering towards the other edge of the recess.

In a structure for electric insulators, the latter structure comprises a coating of the core with moulded insulating material cast between the fixing armatures or a casing made of glass or ceramic substance arranged between the fixing armatures.

In a structure for electric insulators, the latter structure comprises a coating of the core with moulded insulating substance cast between the sealing recesses, or a casing made of glass or ceramic substance, arranged between the sealing recesses.

The core extends outwards beyond one of the fixing armatures.

In a structure for insulators for an electric power conveying line, an armature beyond which protrudes the core comprises a base and the opposite armature comprises means for fixing the line.

Different embodiments of the invention are described hereinbelow by way of an example and with reference to the figures of the accompanying drawings.

DESCRIPTION OF THE PREFERRED EMBODIMENTS

Figure 1:
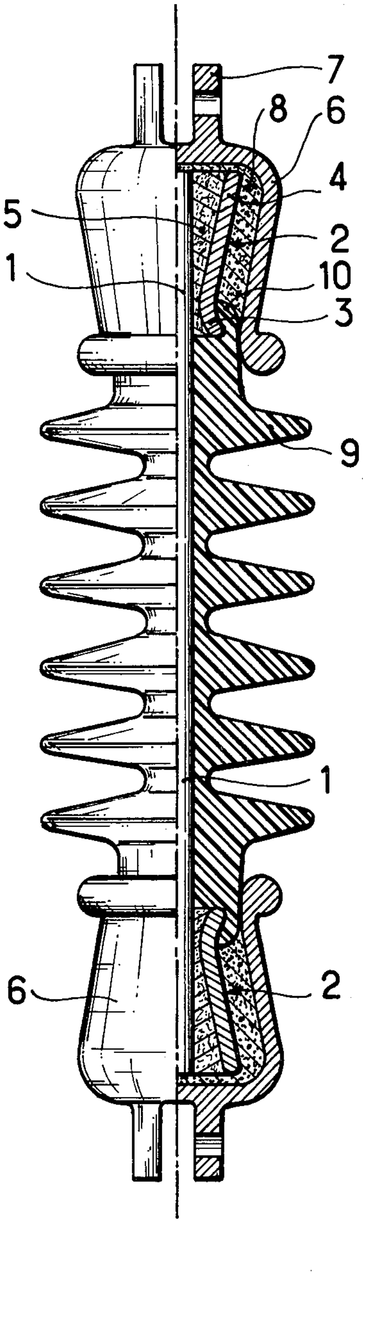
FIG. 1 shows diagrammatically in a half cross-section view an insulator according to the invention.
Figure 2:
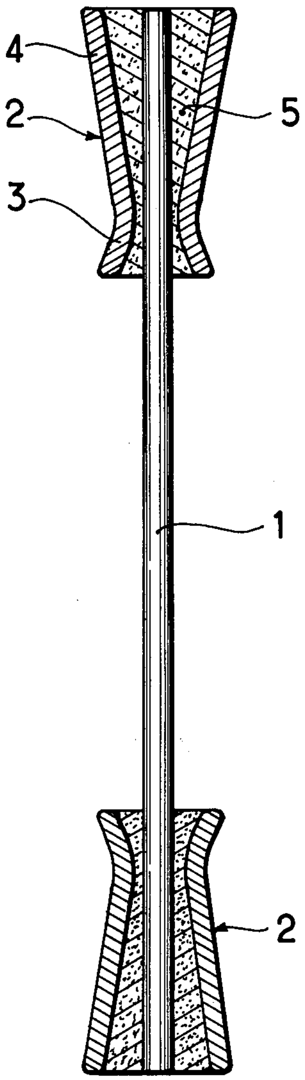
FIG. 2 shows the preliminary stage of sealing of the core in FIG. 1 in two end fixing parts, thus forming a traction element.

The insulator in FIG. 1 is constituted by a traction element shown in FIG. 2, a coating of moulded insulating material 9 and two caps 6. The traction element is constituted by a rod 1 made of glass fibres agglomerated with a synthetic resin and by two end fixing parts 2 having a recess in the form of a "nozzle" constituted by two truncated cones 3 and 4. The rod 1 is sealed in the parts 2 by means of a sealing substance 5 which can be an organic or inorganic cement, charged or not charged with grains of silica, for example, and possibly with fibres. A coating substance made of synthetic resin 9 protecting the rod 1 and the sealing interfaces is cast in a mould, not shown, bearing on the parts 2. Then, two caps 6 provided with fixing elements 7 are sealed on the parts 2. The caps 6 are sealed on the portions 4 of the parts 2 in a usual way by means of a cement 8.

When the insulator is subjected to a mechanical traction, the rod 1 undergoes a certain elongation and the body 9 integral with the rod 1 is also subjected to a traction stress. In its portion 10, due to the undercut, the body 9 is jammed between the cap and the portion 3 of the part 2, this ensuring good fluid-tight sealing of the connection between the body 9 and the cap 6. That fluid-tight sealing can be improved by using, as a sealing substance 8, a resin suitable for adhering to the moulded material of the body 9. The sealing substance 8 and the body 9 forming an assembly together then constitute a continuous and fluid-tight casing. During that elongation of the insulator, the sealing substance 5 undergoes conical jamming in the portion 4 of the part 2 and tends to unstick in the portion 3. Nevertheless, the adhering of the rod 1 to the sealing substance 5 is increased by the elongation of the interface 1–5 beyond the portion 4. The "nozzle" shape therefore promotes the sliding of the sealing substance 5 in the part 2 in relation to the tearing off or to the moving of the core 1 in the sealing substance 5.

That process is reversed in a symmetrical manner when instead of being subjected to traction stresses, the rod 1 is subjected to longitudinal compression stresses. The insulator according to the invention therefore has the advantage of affording, whatever the direction of the stresses may be, a positive resistance to the movement of the rod and of the sealing substance in the end fixing part.

But the "nozzle" shape of the sealing recess has an essential advantage when the sealing of the core in the end fixing parts is effected under mechanical tension.

Figure 4:
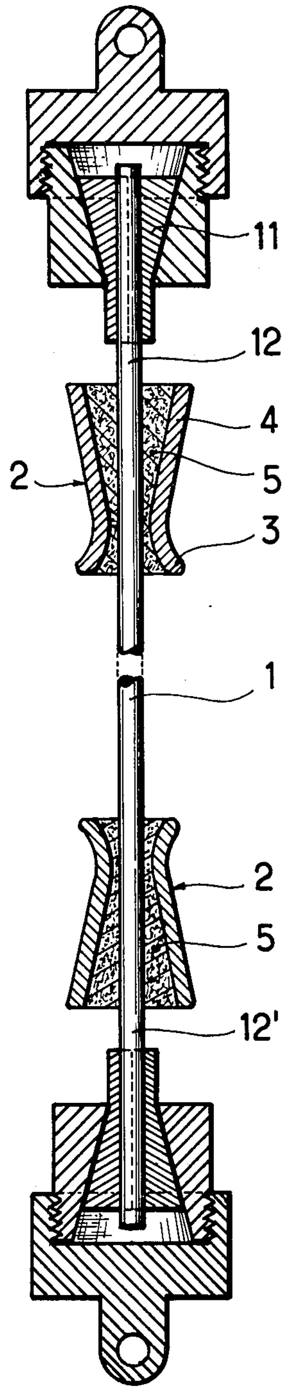
FIG. 4 shows the sealing of the core under tension in two fixing parts.

All that is needed for that purpose, according to FIG. 4, is that the ends of the core 1 be gripped in two traction jaws 11, after having been fitted in the two end fixing pieces 2. The core being subjected to tension, the pieces 2 being positioned at the required distance, sealing is effected by depositing of the sealing material 5. When the latter has set, the traction on the core is released and the ends 12 are cut and brought flush with the level of the edge of the outer cone 4. After the releasing of the external traction stress, traction prestresses occur in the portion of the core situated in the sealing substance, due to the "nozzle" shape of the part 2, and consequently, in the sealing substance 5, there occur compression prestresses which increase the resistance to tearing of the core 1 from the sealing substance 5. Due to that fact, the core can be fixed in the sealing substance without providing, on that core, by machining, as is generally the case, an undercut sealing bearing surface, which is a cause of cracking or of electric interface perforation and of reduction in the tensile strength of the core in the proportion between the square of the diameter of the latter and the minimum diameter of the conical bearing surface.

Figure 3A:
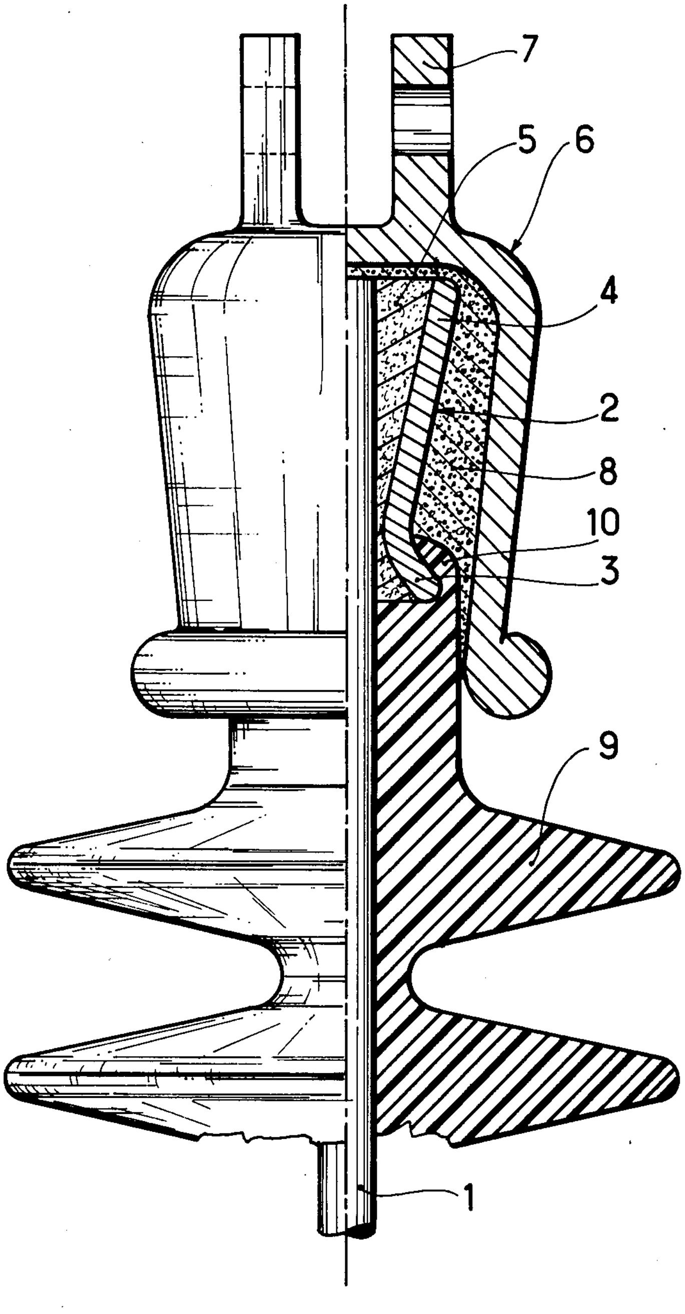
FIG. 3*a* shows, on an enlarged scale, the details of the sealing of the caps constituting the armatures on the end fixing parts of FIG. 2.
Figure 3B:
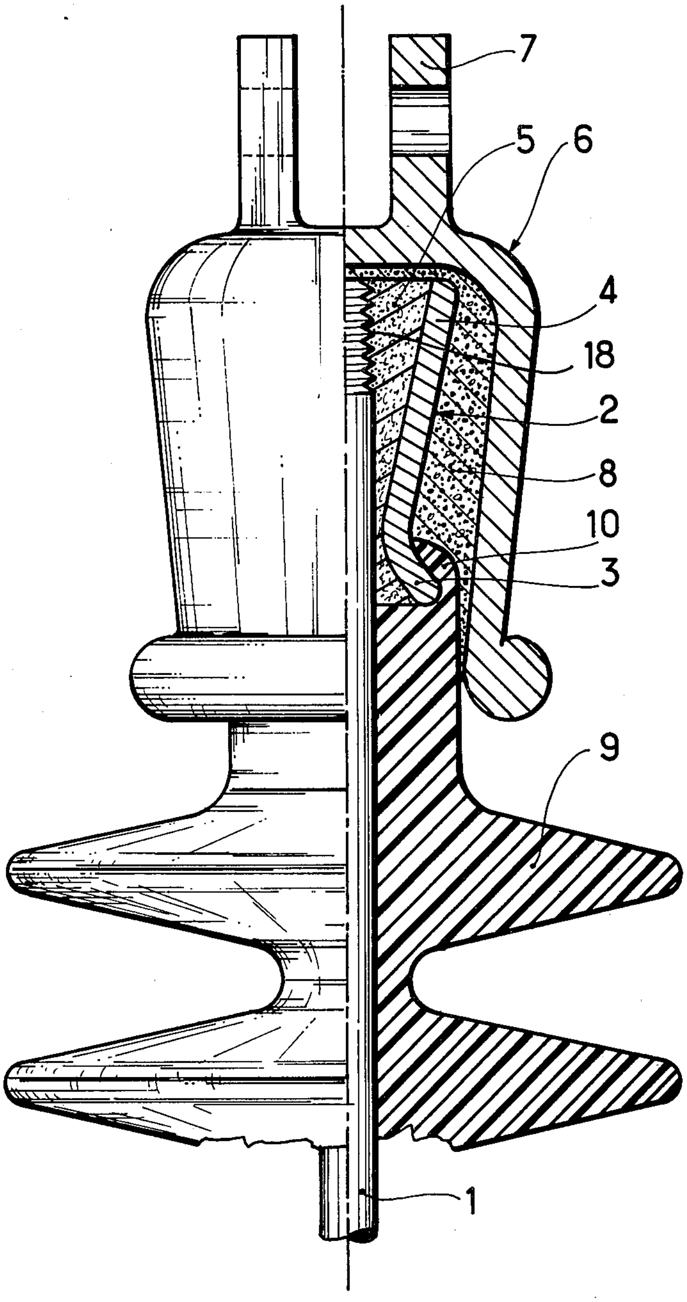
FIG. 3*b* shows a variant of FIG. 3*a* in which the end of the rod is threaded.

It is nevertheless sometimes an advantage to provide, on the end of the core or rod arranged in the vicinity of the armature, a thread (18, FIG. 3*b*) or even a machined portion having an undercut with a slight width, so that the sliding of the sealing substance 5 in relation to its conical recess in the fixing part 2, takes place preferentially to the sliding of the rod 1 itself in the sealing substance, without any substantial reduction in the tensile strength of the core.

Moreover, because of the traction prestresses of the rod 1 in the zone of the inner cone 3 (FIGS. 1 and 3), up to a certain value of the traction stress subsequently applied to the insulator in service, no unsticking of the sealing substance 5 will occur in the zone 3, this reducing the stresses in the insulating coating 9 perpendicular to the cone 3 and improving the fluid-tight sealing.

The use of fixing parts of the "nozzle" type promotes, moreover, an improvement in the electrical perforation resistance because of the spacing of the end of the edge of the portion 3 of the part 2, away from the core 1/sealing substance 5 interface and away from the core 1/insulating coating 9 interface, simultaneously.

Figure 5:
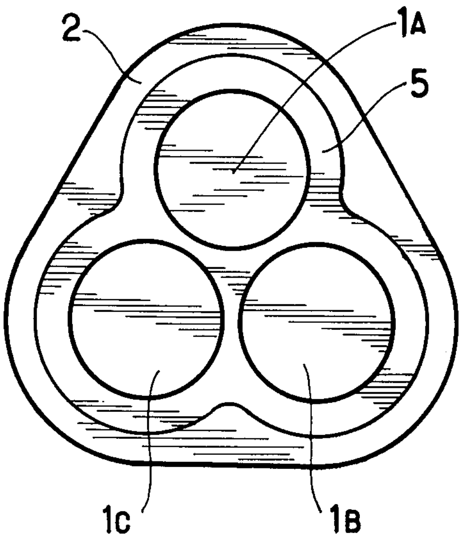
FIGS. 5 and 6 show, seen end on, various forms of sealing recesses for fixing parts.
Figure 6:
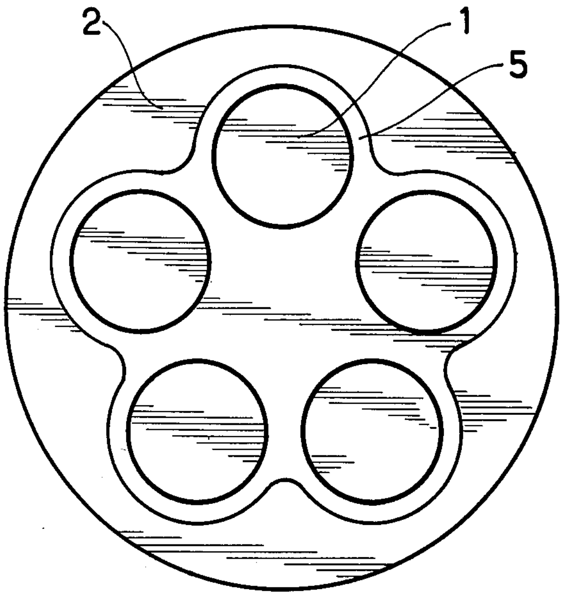
Figure 7:
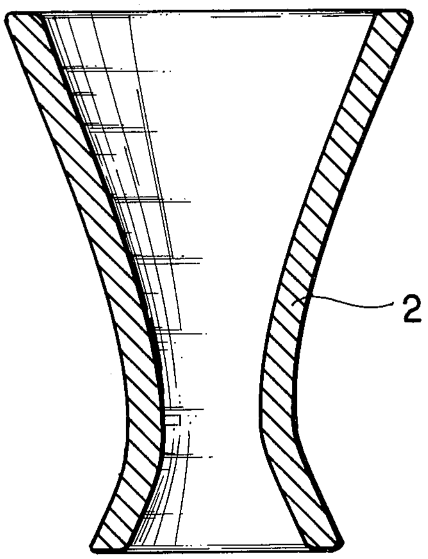
FIG. 7 shows a cross-section profile of a sealing recess for a fixing part.
Figure 8:
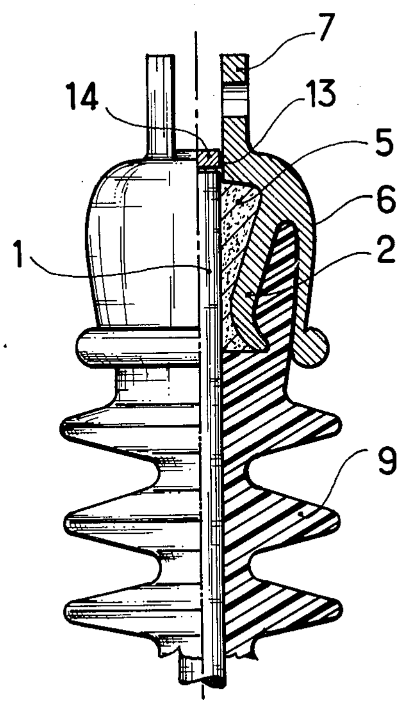
FIG. 8 shows an end fixing part integral with a cap.
Figure 14:
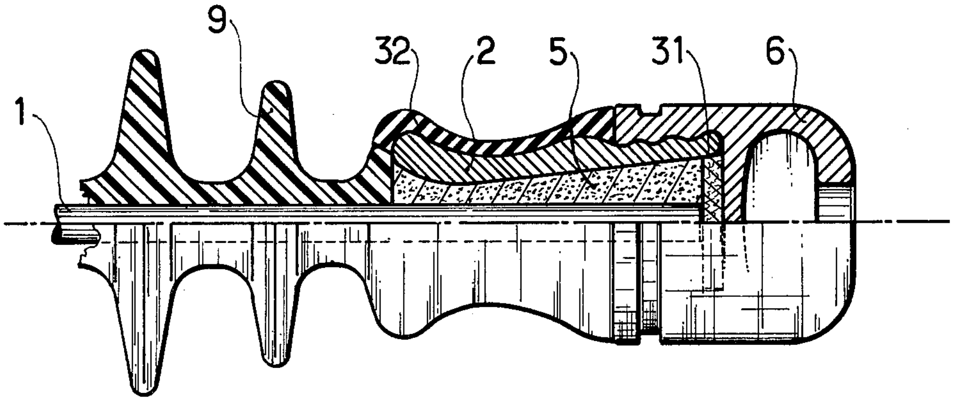
FIG. 14 shows a cross-section of an insulator whose aluminum alloy caps have been moulded on the fixing parts.

It is quite evident that "nozzle" shape means a general profile, and that splines or tiers can be incorporated in the general shape, it being possible also for the cross-section to have a shape other than a circular shape, for example three-cusped with three rods 1A, 1B, 1C, according to FIG. 5, or polygonal with rounded angles having 5 rods according to FIG. 6. The generatrix of the so-called cones 3 and 4 (FIGS. 1 to 3) can also be other than a straight line; in that case, the truncated cones can become portions of surfaces of revolution, for example of paraboloids or of hyperboloids (FIG. 7). The end fixing parts can be provided with a fixing device (FIG. 9) or be integral with the cap (FIG. 8). Thus, because of the thickness of the fixing part protecting the organic material of the insulator, the cap made of aluminium or of an alloy having a low melting point can be moulded directly onto the fixing part (FIG. 14) after insertion of an asbestos washer 31 in a space provided on the outside edge of the fixing part, then the latter can be surrounded by a silicone elastomer sleeve 32.

Figure 9:
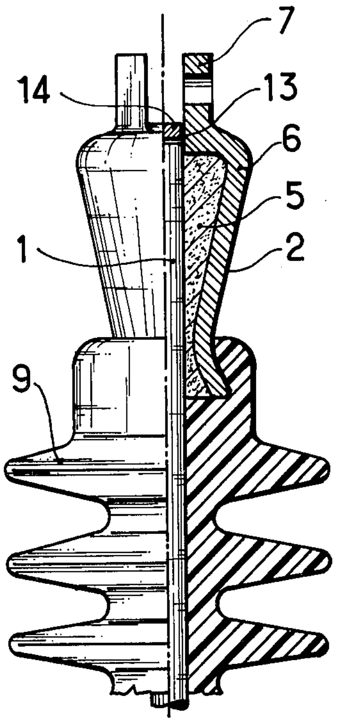
FIG. 9 shows an end fixing part provided with a fixing device.

In the cases of FIGS. 8 and 9, an opening 13, which can be stopped up, through which the ends of the rod or rods constituting the core can be passed to effect the sealing operations on the core subjected to traction, can be provided at the part of the cap or of the fixing part. After the core has been sealed and made flush, the opening 13 is stopped up by a cover 14.

Figure 10:
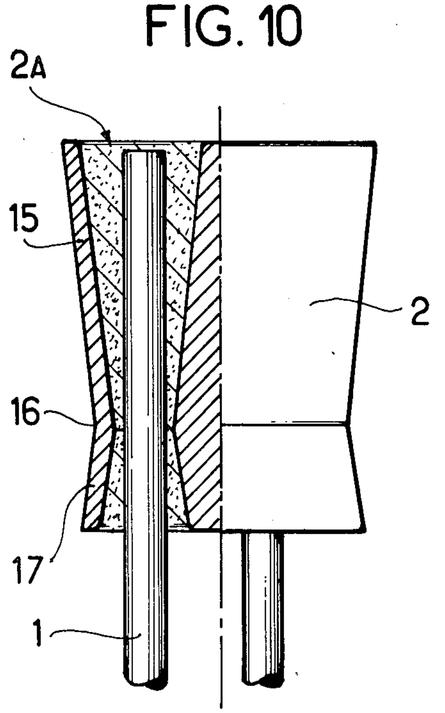
FIG. 10 shows a half cross-section view of an end fixing part comprising several recesses.
Figure 11:
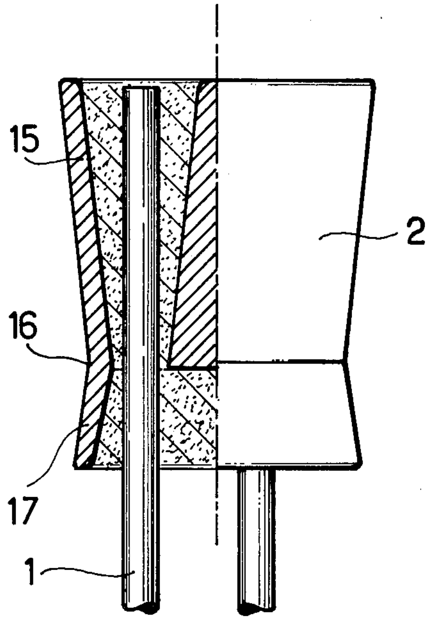
FIG. 11 shows a half cross-section profile of an end fixing part comprising, up to a certain height, several recess bearing surfaces communicating with a common recess on the remainder of the height.
Figure 12B:
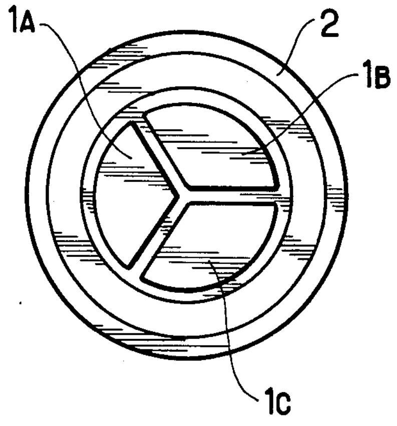

Lastly, the fixing part, which is generally but not compulsorily metallic, can comprise several "nozzle" type recesses according to the invention, such as 2A (FIG. 10) or a recess according to FIG. 11 comprising several separate portions 15, tapering towards the outside edge and communicating, in an intermediate plane 16, with one and the same part 17, also tapering towards the other outside edge.

According to another characteristic of the invention, the applicant has observed that the core/armature connection is easily made in the case where the armature has a large diameter, by forming the core with several rods arranged parallel to one another and sealed on at least a part of their ends in a same recess.

Indeed, each elementary rod, having a diameter smaller than that of a single rod, with a strength corresponding to the sum of the strengths of the elementary rods, is easier to produce and has, in general, a greater strength per squ.cm. of cross-section than that of the equivalent single rod, due to the unavoidable imperfections in production of such a single rod having a large cross-section. The elementary rods/sealing substances interface is appreciably higher than that of a single rod for a same sealing substance surface of the recess interface, this promoting the sliding of the sealing substance in the fixing part in relation to the tearing off or moving of the core in relation to the sealing substance.

That improvement, added to the advantages previously set forth, makes it possible, in that case also, to dispense with all machining of the ends of the rods before sealing and to increase the strength per squ.cm. of cross-section of the core. Thus a tensile strength of 232 kN, that is, 97 kN/squ.cm., was obtained for insulators according to the invention comprising a core constituted by three cylindrical rods gaving a cross-section of 79 squ.cm. sealed in a "nozzle" type recess whereas a usual compound insulator with a cross-section surface of the core of 2.02 squ.cm. was found to have, in the same test conditions, a tensile strength of 51 kN/squ.cm.

The reduction in diameter of the shaft has the further advantage, all other things being equal, of improving the form factor of the insulator (related to the surface strength of the insulator).

Figure 12A:
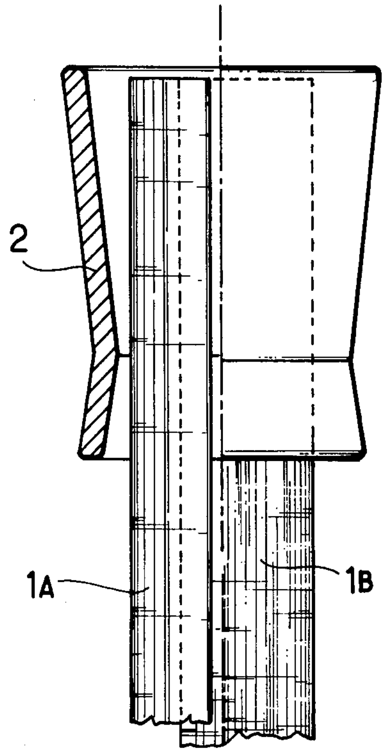
FIGS. 12*a* and 12*b* show an axial half cross-section and an end on view of the core of an insulator according to the invention, constituted by 3 elementary rods having a sectorial cross-section.

It can be an advantage to impart to each elementary rod a sectorial shape corresponding to the number of elementary rods; thus, in the case of three rods, the shape of a sector having an angle of 120° is imparted to these latter, as shown in FIGS. 12*a,* 12*b* in which the nozzles have been shown without any sealing substance (rods 1A, 1B, 1C). Likewise, the end fixing parts or the armatures can be provided with internal or external fixing means enabling the interconnecting of insulating elements of a same type or of insulating elements having external elements.

Figure 13:
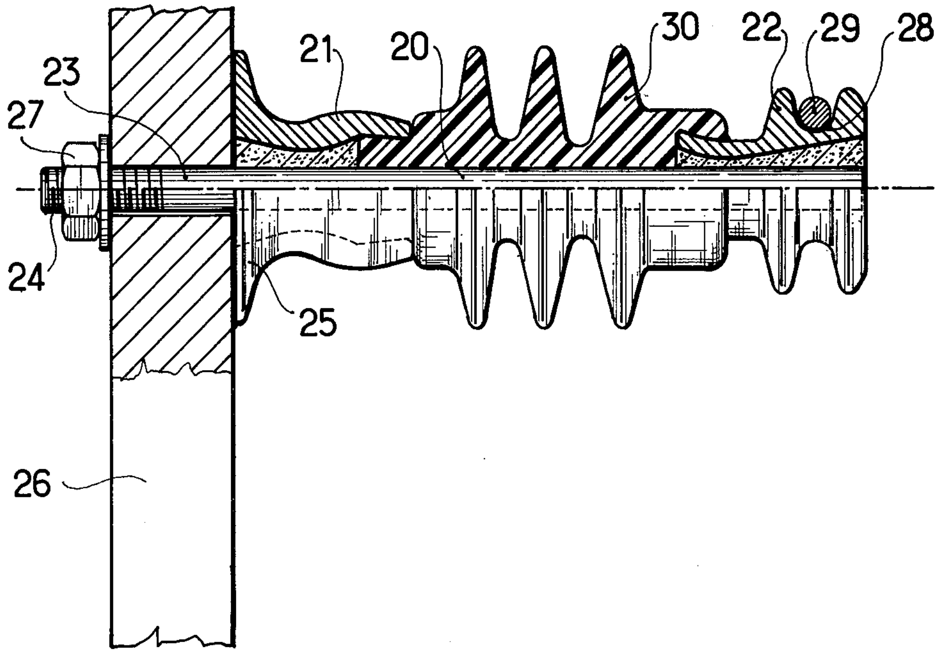
FIG. 13 shows a partial cross-section of a horizontal support insulator.

Besides the advantages set forth relating to the increase in the mechanical strength or in the reduction of the bulk dimensions and to the improving of the electrical qualities, the invention also affords advantages of simplicity in construction and lightness particularly well illustrated in the example of embodiment of the horizontal support insulator according to FIG. 13.

That insulator is constituted by a compound core 20 made of glass fibres agglomerated with a synthetic resin on which are sealed two end fixing parts 21 and 22 in the shape of a "nozzle" and constituting the armatures. The core 20 is extended at 23 beyond the part 21 and comprises a thread 24 at its end. The part 21 comprises a bearing surface 25 on a post 26 through which the extension 23 crosses and is held pressed on the post by the screwing of a nut 27. The part 22 comprises a groove 28 in which is fixed the conductor 29. A coating 30 is moulded on the core 20 and either on the inside or on the outside of the parts 21 and 22.

The structures of the invention apply more particularly to suspension insulators for electric lines, stays, control means for electrical equipment and, in general, whenever high mechanical strength per unit of cross-section is required.

It is quite evident that the various examples described, although they constitute preferable embodiments, have no limiting character, that equivalent arrangements can be substituted when they fulfill the same technical function and that the details of construction described in certain embodiments can be substituted for others. Thus, the coating can optionally be connected to the fixing parts or to the armatures, inside or outside those parts.

I claim:

1. In a structure for transmitting great mechanical stresses, comprising an elongated core including at least one agglomerated glass fibre rod and fixing armatures fitted to respective ends of the rod and wherein each fixing armature comprises means defining two end-to-end truncated conical surfaces which telescopingly receive an end of said rod and which flare outwardly, away from each other, said surfaces being of nozzle shape and forming a sealing recess within each fixing armature for the rod and having portions which taper on either side of an intermediate zone, said sealing recesses opening freely on their ends facing each other, and a sealing substance within each recess for sealing the gap between said rod and said conical surfaces and being capable of sliding on the conical surfaces when said rod is submitted to longitudinal force relative to said armatures.

2. Structure according to claim 1, characterized in that the rod is sealed in each sealing recess in a state of longitudinal mechanical tension.

3. The structure according to claim 1, wherein the ends of the rod within the conical surface of the armatures facing away from each other are machined with a transverse undercut of slight thickness, so that sliding of the sealing substance normally occurs with respect to the armatures and not with the rod.

4. The structure according to claim 1, characterized in that the core comprises several rods and that each rod is sealed at at least one of its ends in a corresponding sealing recess within the corresponding armature.

5. The structure according to claim 1, characterized in that the core comprises several rods and that each rod is sealed at at least one of its ends in a recess comprising a number of separate parts equal to the number of rods, said parts tapering towards an edge of the recess and communicating in an intermediate zone with a common part tapering towards the other end of the recess.

* * * * *